United States Patent [19]
Iwasaki

[11] Patent Number: 6,113,058
[45] Date of Patent: Sep. 5, 2000

[54] COUPLING DEVICE

[75] Inventor: Kenichiro Iwasaki, Kanagawa-ken, Japan

[73] Assignee: Bridgestone Corporation, Tokyo, Japan

[21] Appl. No.: 09/061,368

[22] Filed: Apr. 16, 1998

[30] Foreign Application Priority Data

Apr. 21, 1997 [JP] Japan .................................. 9-117608

[51] Int. Cl.⁷ ........................................... F16M 1/00
[52] U.S. Cl. .............................................. 248/678
[58] Field of Search ................... 248/635, 638, 248/647, 916; 180/300, 312; 267/141.2, 292; 403/225

[56] References Cited

U.S. PATENT DOCUMENTS

| | | | |
|---|---|---|---|
| 3,244,435 | 4/1966 | Weiss | 403/225 X |
| 4,240,517 | 12/1980 | Harlow, Jr. et al. | 180/300 X |
| 4,779,834 | 10/1988 | Bittner | 180/300 X |
| 5,114,178 | 5/1992 | Baxter | 267/292 X |
| 5,152,510 | 10/1992 | Komabishiri | 267/141.2 |
| 5,398,907 | 3/1995 | Kelchner | 267/292 X |

FOREIGN PATENT DOCUMENTS

| | | |
|---|---|---|
| 1-126413 | 5/1989 | Japan . |
| 7-197927 | 8/1995 | Japan . |

*Primary Examiner*—Ramon O. Ramirez
*Assistant Examiner*—Anita M. King
*Attorney, Agent, or Firm*—Jordan and Hamburg LLP

[57] ABSTRACT

A coupling device is disclosed which comprises an elongated plate-shaped synthetic resin-made rod body, a synthetic resin-made cylindrical portion formed integrally at at least one end of the rod body, and a joint piece provided inside the cylindrical portion and which is to be coupled to a mating object; the rod body consisting of a plate member ribbed orthogonally, and along each longitudinal perimeter, thereof; each rib being recessed in an opposite direction to the projecting direction thereof and along at least a portion of the length thereof to provide a pair of outer and inner ribs which form together a double structure.

13 Claims, 9 Drawing Sheets

FIG.16

COUPLING DEVICE

BACKGROUND OF THE INVENTION

1. Field of the Invention

The present invention relates to a coupling device such as a link rod used as a suspension link for automobiles, an engine mount which couples an automobile engine and a chassis, or the like.

2. Description of Related Art

Figure 1:
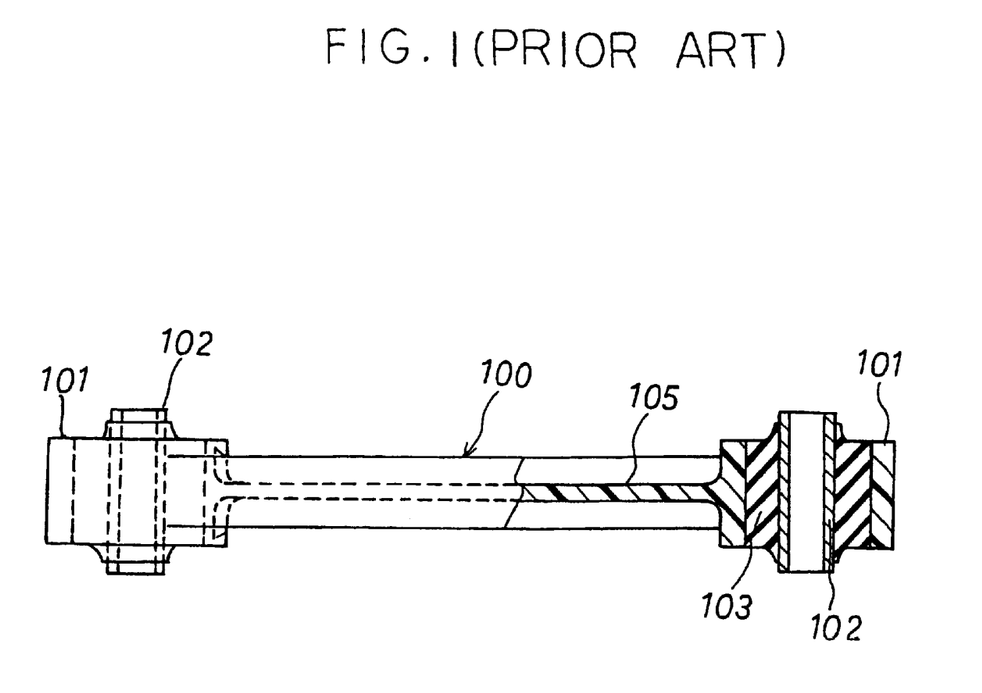
FIG. 1 is a partially fragmentary front view of a conventional coupling device.
Figure 2:
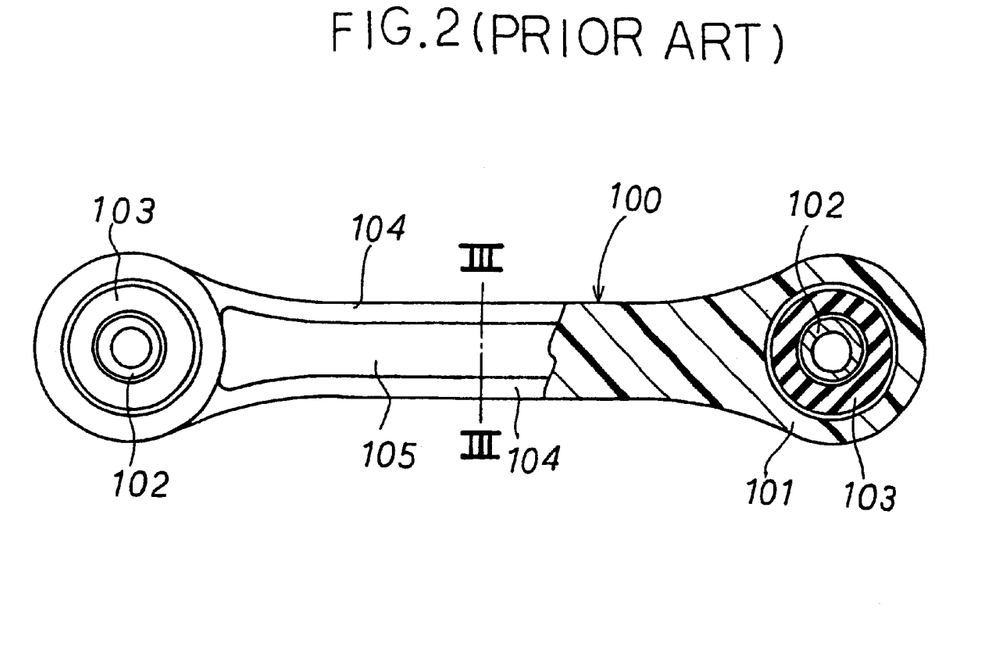
FIG. 2 is a plan view of the coupling device shown in FIG. 1.
Figure 3:
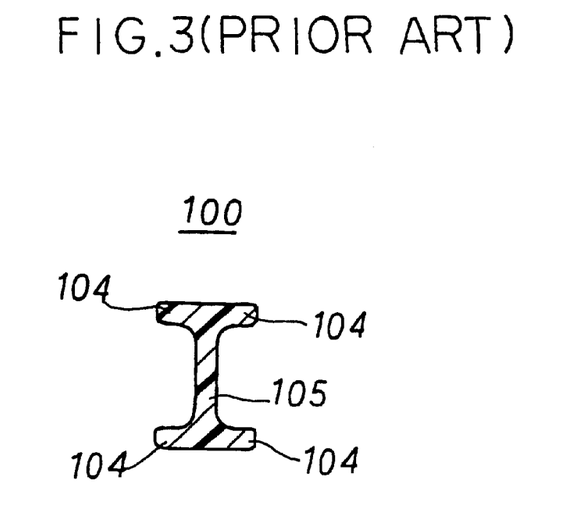
FIG. 3 is sectional view taken along the line III—III in FIG. 2.

The well-known coupling devices include a link rod shown by way of example in FIGS. 1 to 3. As best shown in FIGS. 1 to 3, the link rod comprises an elongated plate-like rod body 100 made of a synthetic resin. The rod body 100 has a cylindrical end portion 101 formed integrally at each end thereof. Each cylindrical portion 101 has a cylindrical joint piece 102 disposed therein. A rubber-made elastic joint piece 103 is formed between the cylindrical portion 101 and joint piece 102. The rod body 100 consists of a plate member 105 ribbed as indicated with a reference numeral 104 to reinforce the plate member 105 and hence the rod body 100 as a whole. The ribs 104 are formed in two pairs, upper and lower, on the plate member 105. The ribs 104 in each pair extrude in opposite directions orthogonal to the plate member 105. They extend along the longitudinal perimeters, upper and lower, respectively, of the plate member 105 as well as between the cylindrical portions 101.

If such a link rod is used as a suspension link of an automobile, the rod body 100 or any other synthetic resin-made portion thereof is likely to be broken by a stone or the like bounded from the road surface by the wheel of the running automobile or by a curb with which the rod body 100 will possibly collide when the automobile comes too close to the sidewalk. If the rod body or cylindrical end portion is cracked or injured, the link rod itself will be damaged or loose the strength due to a stress concentration to such a cracked or injured portion.

SUMMARY OF THE PRESENT INVENTION

Accordingly, the present invention has an object to overcome the above-mentioned drawbacks of the prior art by providing a coupling device of which a synthetic resin-made portion likely to collide with such a leaping stone or other object is improved in strength.

The above object can be accomplished by providing a coupling device comprising an elongated plate-shaped synthetic resin-made rod body, a synthetic resin-made cylindrical portion formed integrally at at least one end of the rod body, and a joint piece provided inside the cylindrical portion and which is to be coupled to a mating object; the rod body consisting of a plate member ribbed orthogonally, and along each longitudinal perimeter, thereof; each rib being recessed in an opposite direction to the projecting direction thereof and along at least a portion of the length thereof to provide a pair of outer and inner ribs which form together a double structure.

According to another aspect of the present invention, the cylindrical portion is recessed concentrically in either axial end face thereof, or in one of the axial end faces thereof, along at least a portion of the concentric circle to have a double structure in at least a portion thereof.

The above object can also be accomplished by providing a coupling device comprising an elongated plate-shaped synthetic resin-made rod body, a synthetic resin-made cylindrical portion formed integrally at at least one end of the rod body, a joint piece provided inside the cylindrical portion and which is to be coupled to a mating object, and a rubber-made elastic member provided between the cylindrical portion and joint piece; the cylindrical portion being recessed concentrically in each axial end face thereof, or in one of the axial end faces thereof, along at least a portion of the concentric circle to have a double structure in at least a portion thereof.

In the coupling device according to the present invention, since a portion of the perimeter thereof has a double structure, so the outer rib will protect the inner one. Even if the outer rib or the perimeter is injured by a stone or the like as mentioned above, the inner rib can be protected by the outer rib so that the coupling device can be kept against a sudden attenuation of its strength.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION OF THE PREFERRED EMBODIMENTS

Figure 4:
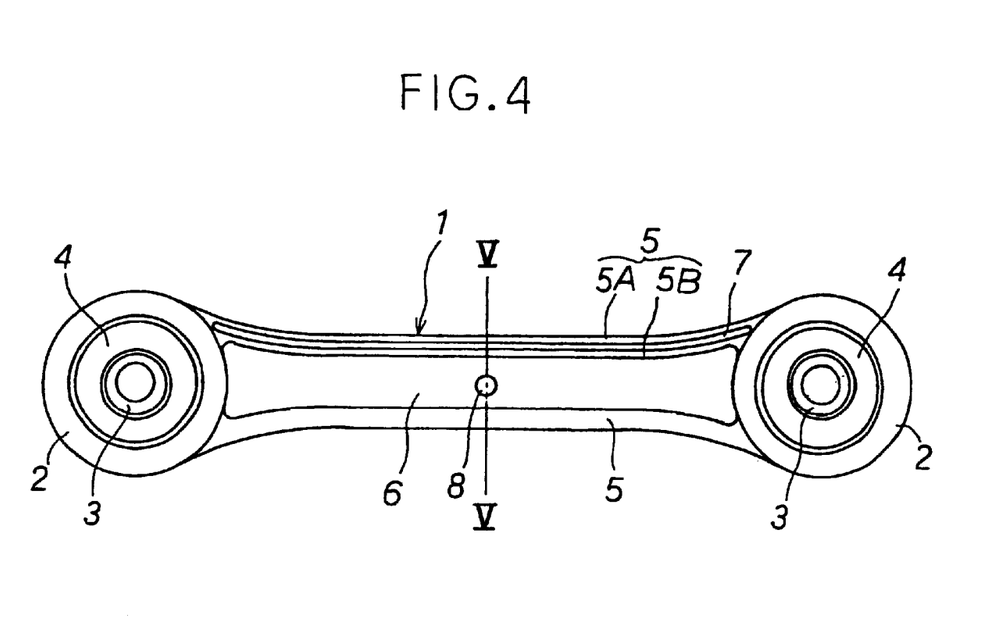
FIG. 4 is a plan view of a first embodiment of the present invention.

FIG. 4 illustrates the first embodiment. As shown, it is comprised of an elongated plate-like synthetic resin-made rod body 1, a synthetic resin-made cylindrical portion 2 formed integrally on either end of the rod body 1, a joint piece 3 disposed within the cylindrical portion 2 and which is to be connected to a mating object, and a rubber-made elastic member 4 disposed between the cylindrical portion 2 and joint piece 3. In this embodiment, the joint piece 3 is a metallic cylinder through which a bolt is penetrated. The rod body 1 is formed from a plate member 6 ribbed as indicated with a reference numeral 5 along the perimeter thereof defining the profile thereof. The ribs 5 protrude in opposite directions orthogonal to the plate member 6. That is, the rod body 1 has an "H-shaped" cross section. According to the first embodiment, one of the upper and lower pairs of ribs 5 is recessed as indicated with a reference numeral 7 longitudinally thereof. Thus, the rib 5 consists of an outer rib portion 5A and inner rib portion 5B which form together a double structure.

Figure 5:
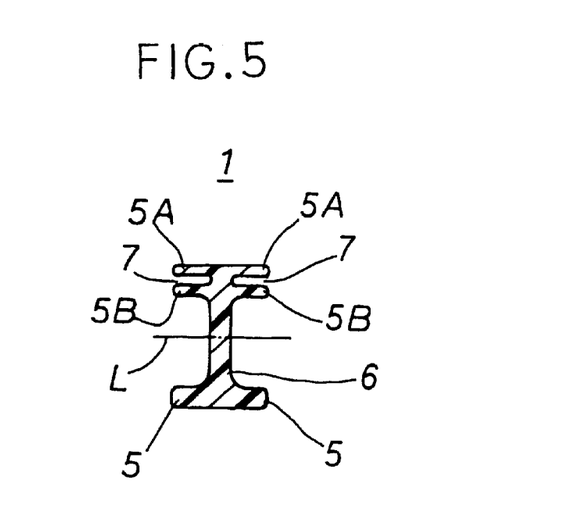
FIG. 5 is a sectional view taken along the line V—V in FIG. 4.

FIG. 5 is a sectional view taken along the line V—V in FIG. 4. FIG. 5 best shows the above-mentioned double structure of the rib 5. As will be seen, the rod body 1 is formed so that upper and lower halves thereof divided by a horizontal line L passing through the vertical mid point thereof are generally equal in area to each other. In this embodiment, the recess 7 is formed to extend to either cylindrical portion 2. However, the double structure of the rod body 1 may be formed to extend along an appropriate length of the rod body 1 as necessary. Also, since the outer and inner rib portions 5A and 5B in the double structure of the rod body 1 are so thin because of the recess 7 that a synthetic resin material will flow slowly during injection molding of the product, it is possible to adjust the position of a weld taking place in the molded product. When a gate 8 is located as shown, welds will take place off the upper right of the right-hand cylindrical portion 2 and off the upper left of the left-hand cylindrical portion 2, respectively.

Figure 6:
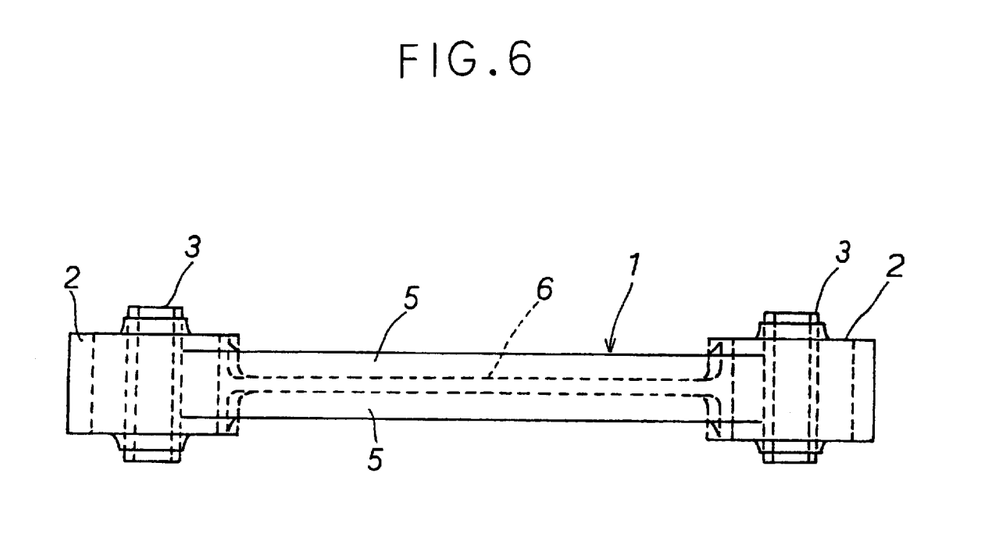
FIG. 6 is a front view of the first embodiment shown in FIG. 4.

FIG. 6 is a front view, from below, of the coupling device according to the present invention on the assumption that FIG. 4 is a plan view. The coupling device according to the first embodiment shown in FIGS. 4 to 6 is produced by setting the joint piece 3 made of a metallic cylinder in a vulcanization injection mold, injecting and vulcanizing a rubber material about the joint piece 3, and then fitting the rubber-made elastic member 4 onto the joint piece 3. Next, two assemblies thus made of the joint piece 3 and rubber-made elastic member 4 are set in an injection mold, and a molten resin is injected from the gate 8 into a cavity defined between the two rubber-made elastic members 4 thus set while the resin is fed to around the respective rubber-made elastic members 4. In this way, the cylindrical portions 2 made of the synthetic resin is formed about the rubber-made elastic member 4, and the synthetic resin-made rod body 1 is thus molded between the cylindrical portions 2. The rubber-made elastic member 4 is compressed under the injection pressure of the molten resin.

The link rod for vehicles is 10 to 100 cm long. The link rod 1 in the above-mentioned embodiment is 60 cm in total length, the width of the portion connecting the two cylindrical portions 2, namely, the length along the line V—V in FIG. 4, is 40 mm, the width of the recess 7 is 3 mm, the width of each of the outer and inner ribs 5A and 5B is also 3 mm, and the width of the rib 5 in which the recess 7 is not formed is 6 mm. The width of the recess 7 is a minimum of 2 mm because of the mold's geometry. If this recess width is too large, the intended purpose of the present invention cannot be attained.

Figure 7:
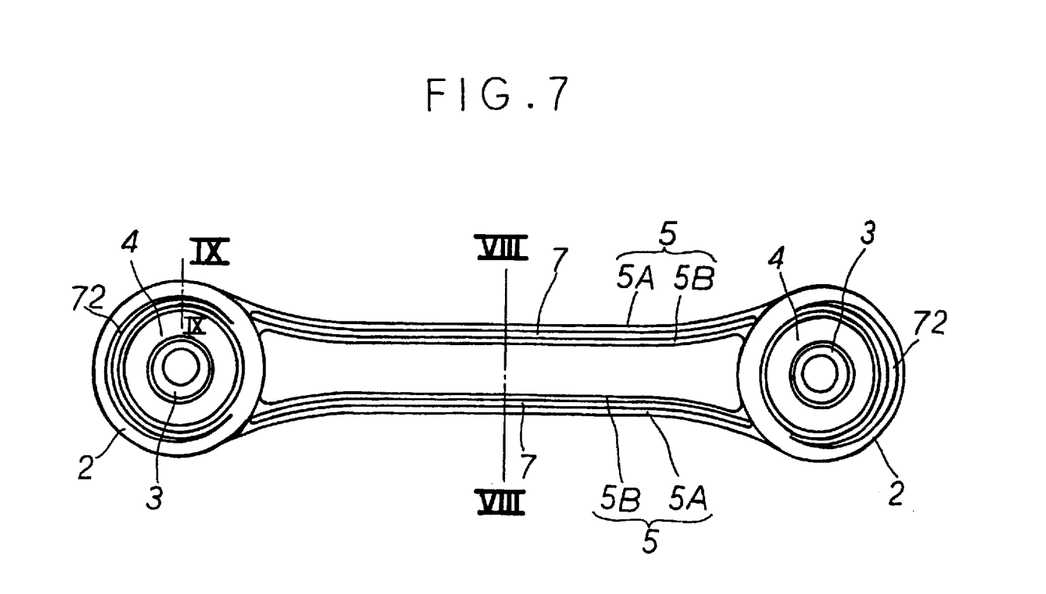
FIG. 7 is a plan view of a second embodiment of the present invention.

FIG. 7 shows the second embodiment of the present invention in which a similar recess to the recess 7 in the first embodiment is formed in each rib 5 in one pair of the opposite ribs 5 as well as in the other pair. According to this embodiment, a recess 72 is formed in a part of the cylindrical portion 2 as well. Thus, the part of the cylindrical portion 2 has a double structure. In this embodiment, the recesses 7 are formed in the ribs, except for a part thereof, which are joined to the rod body 1.

Figure 8:
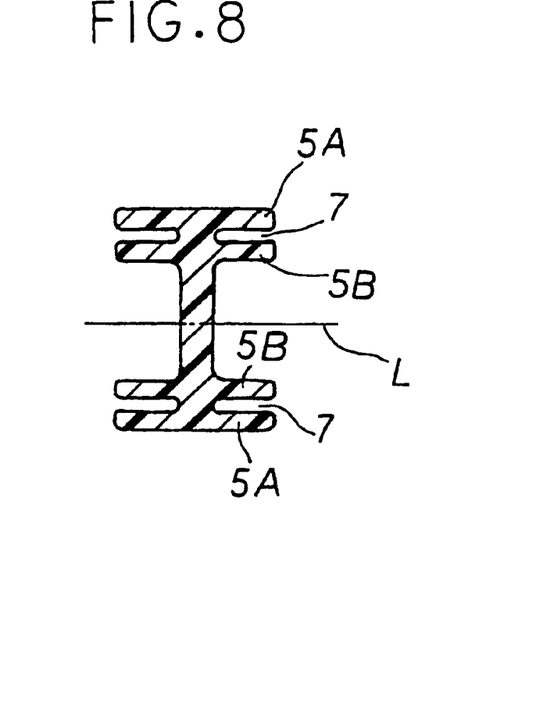
FIG. 8 is a sectional view taken along the line VIII—VIII in FIG. 7.

FIG. 8 is a sectional view taken along the line VIII—VIII in FIG. 6. As shown, the rod body 1 is so formed that upper and lower halves thereof divided by a line L passing through the vertical mid point thereof are generally equal in area to each other.

Figure 9:
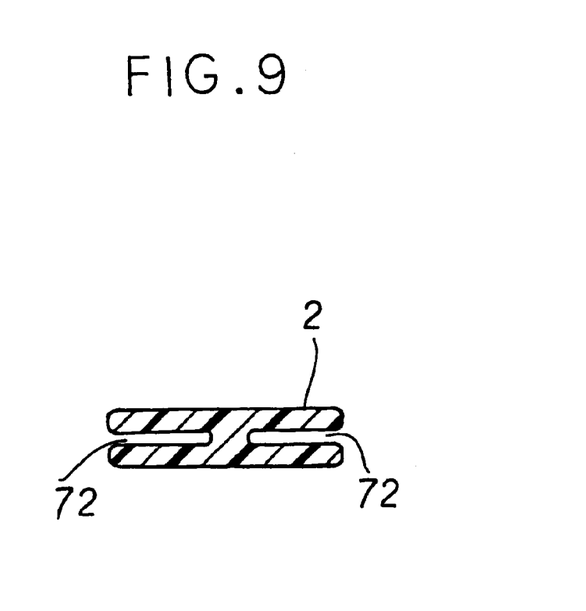
FIG. 9 is a sectional view taken along the line IX—IX in FIG. 7.

FIG. 9 is a sectional view taken along the line IX—IX in FIG. 7. The cylindrical portion 1 has the recesses 72 formed in an opposite direction to the projecting direction thereof and concentrically from either end thereof. Thus, a peripheral part of the cylindrical portion 2 has a double structure.

Figure 10:
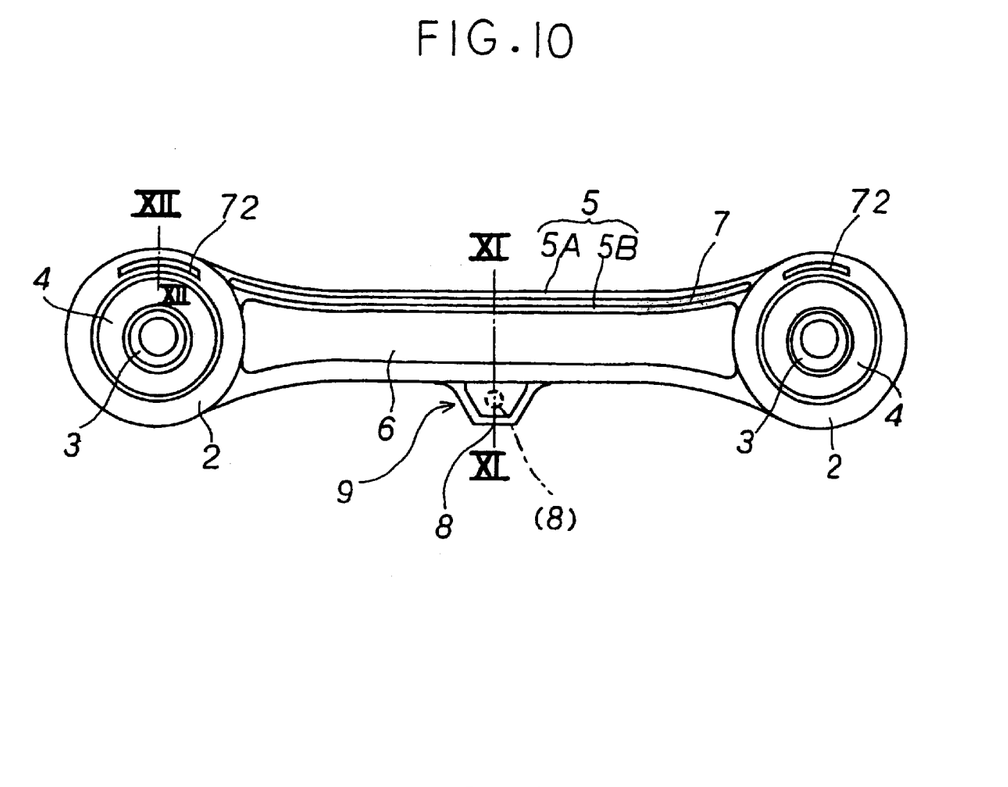
FIG. 10 is a plan view of a third embodiment of the present invention.
Figure 11:
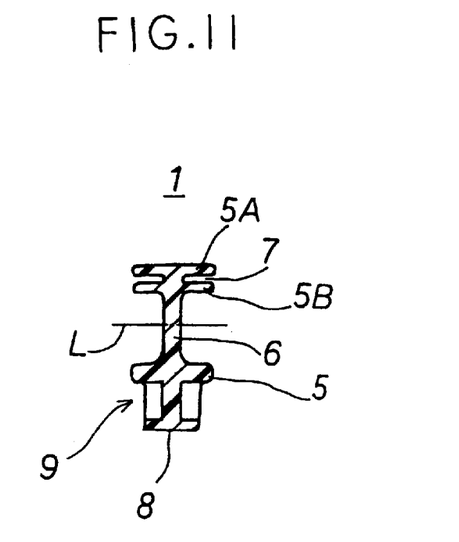
FIG. 11 is a sectional view taken along the line XI—XI in FIG. 10.
Figure 12:
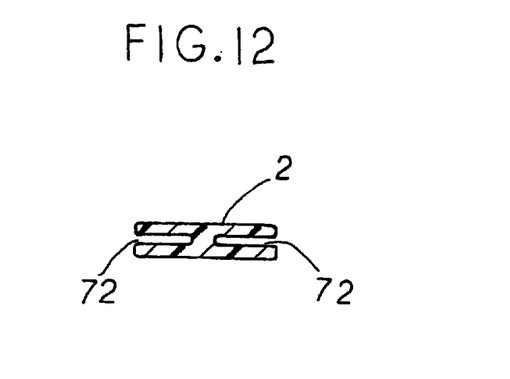
FIG. 12 is a sectional view taken along the line XII—XII in FIG. 10.
Figure 13:
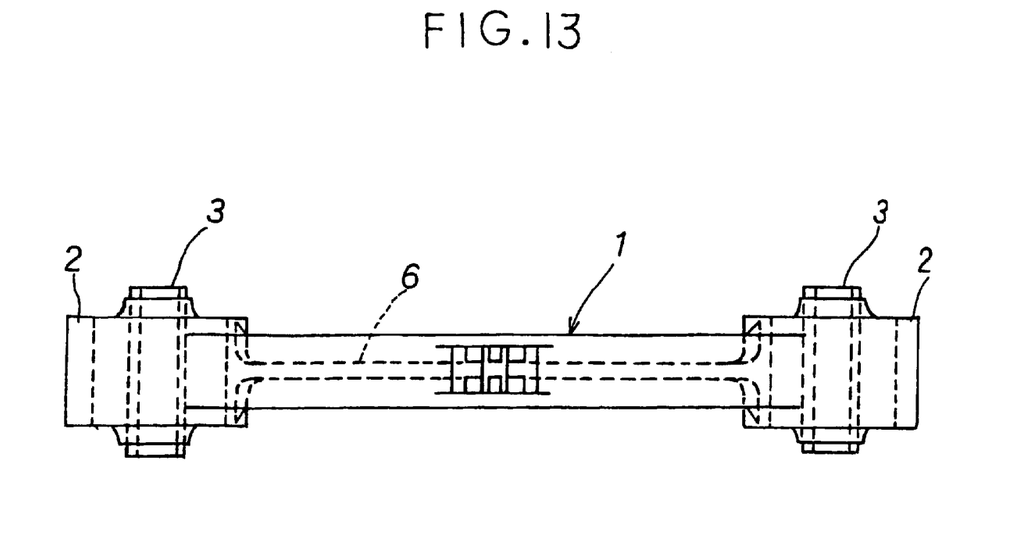
FIG. 13 is a front view of the third embodiment shown in FIG. 10.

FIG. 10 is a plan view of a third embodiment in which the recess 7 is formed only in one pair of the ribs 5 to form a similar double structure to that shown in FIG. 7. Also, the recess 72 is formed in a part of the cylindrical portion 2 in a same direction as that of the recess 7 in the rod body 1 (upper rib in the plane of the drawing). Thus the cylindrical portion 2 has a double structure. In the third embodiment shown in FIGS. 10 and 11, a projection 9 is provided to position a gate therein for use during an injection molding. A gate is located in either of the two positions indicated with the reference numeral 8. Also, in this embodiment, the rod body 1 has a double structure formed only along one longitudinal perimeter thereof as seen from FIG. 11. As shown in FIG. 12, the partial double structure has the recesses 72 formed above and below the axial direction of the cylindrical portion 2. FIG. 13 is a front view of the coupling device shown in FIG. 10. In the foregoing, the present invention has been described concerning a coupling device using the joint piece 3 made of a metallic cylinder. However, it should be appreciated that, a ball joint may be used in place of the cylindrical joint piece 3 as in a stabilizing link rod. In this case, the rubber-made elastic member 4 is not formed but the ball joint will be enclosed directly by the synthetic resin-made cylindrical portion 2.

Figure 14:
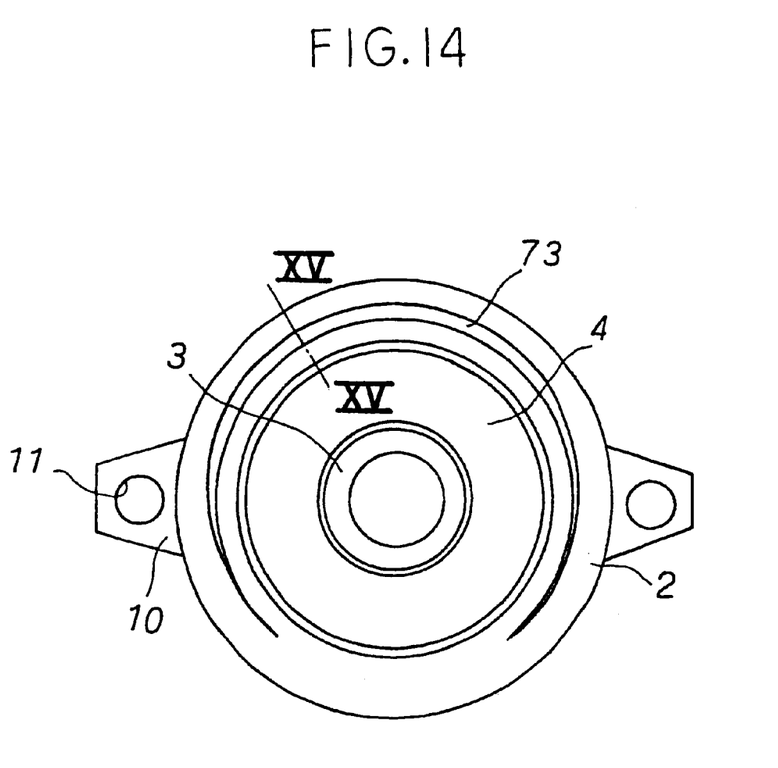
FIG. 14 is a plan view of a fourth embodiment of the present invention.
Figure 15:
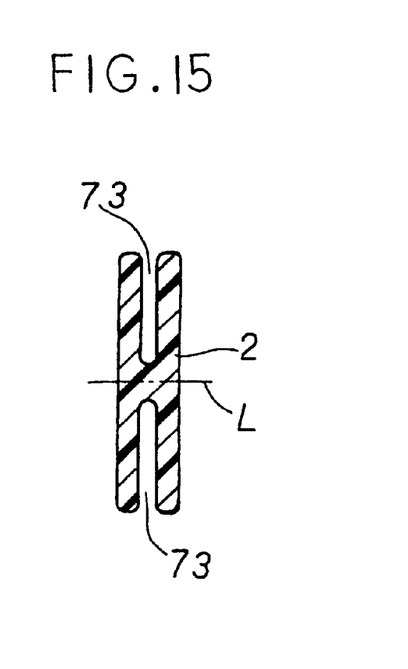
FIG. 15 is a sectional view taken along the line XV—XV in FIG. 14.
Figure 16:
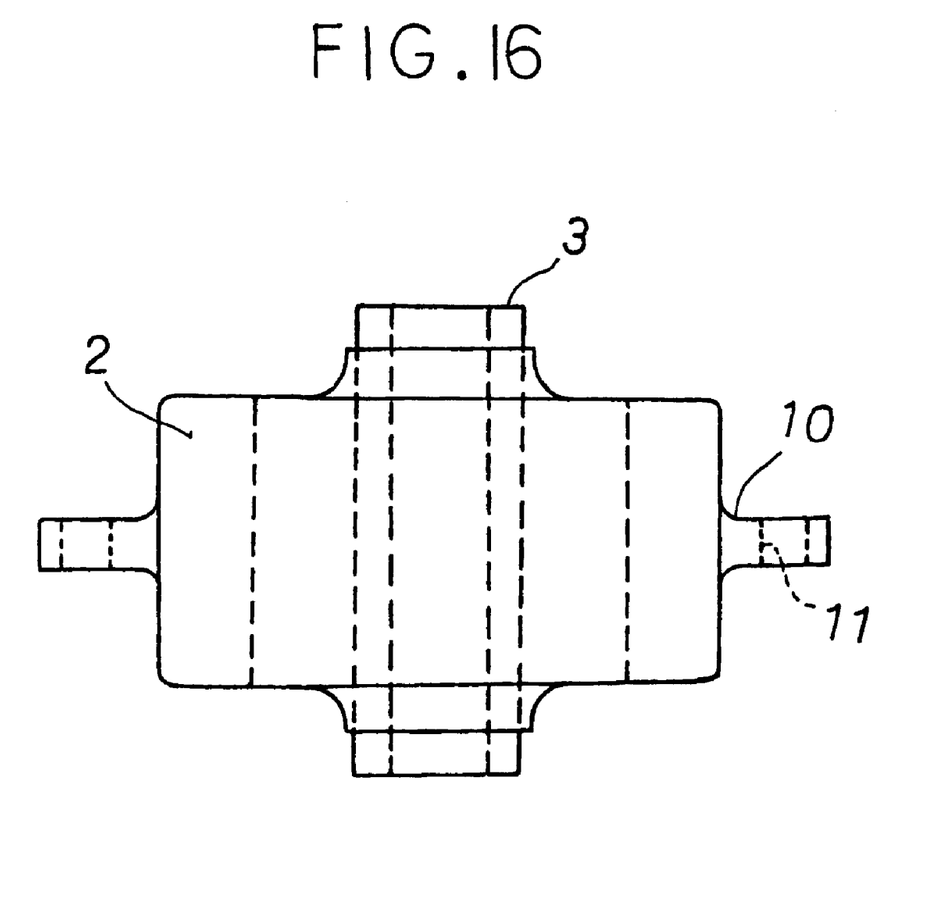
FIG. 16 is a front view of the fourth embodiment shown in FIG. 14.

FIG. 14 shows the fourth embodiment of the present invention. This embodiment is not used as a coupling device but as a bush used in an engine mount to connect an automobile engine and a chassis as well as in various links. This coupling device comprises a cylindrical member 2 made of a synthetic resin in which a joint piece 3 is disposed. A rubber-made elastic member 4 is provided between the joint piece 3 and cylindrical member 2. The cylindrical member 2 has formed axially therein a recess 73 from both end thereof. The recess 73 may be provided at only one end of the cylindrical member 2. Thus, the cylindrical member 2 has a double structure as shown in FIG. 15. Of this coupling device, the upper half above a horizontal line L and the lower half below the line L are generally equal in sectional area to each other. FIG. 16 is a front view of the coupling device shown in FIG. 14. This is a bottom view of the coupling device. It should be noted that a pair of fixtures 10 is formed integrally on the cylindrical member 2 for installation to any other equipment. Owing to a hole 11 formed in the fixture 10, the coupling device can be fixed to any other unit than an one to which the joint piece 3 is fixed.

It should also be noted that the ribs 5 may be formed to provide a triple or multiple structure of the coupling device. Also, only the right or left half of each of the embodiments of the coupling device shown in FIGS. 5, 11, 12 and 15, respectively, may be formed to have a double structure. Furthermore, the outer and inner ribs 5A and 5B may be different in height from each other.

What is claimed is:

1. A coupling device, comprising:
    an elongated plate-shaped synthetic resin-made rod body,
        a synthetic resin-made cylindrical portion formed integrally at at least one end of the rod body, and a joint piece provided inside the cylindrical portion and which is to be coupled to a mating object;
    the rod body including a plate member presenting a ribbed region extending longitudinally along first and second peripheral sides of said plate member, said ribbed region including rib structure projecting in opposite directions orthogonal to the plate member;

at least a length portion of said rib structure disposed along at least one of said first and second peripheral sides on at least one of opposite faces of said plate member being recessed in an opposite direction to a projecting direction thereof to define a pair of outer and inner ribs spaced-apart from one another over said length portion and positioned within said ribbed region, said outer rib being located proximal an outermost edge of said plate member; and said rib region being laterally spaced apart from a longitudinal central axis of said plate member, said inner rib being located between said longitudinal central axis and said outer rib, and positioned substantially closer to said outer rib than to said longitudinal central axis, said inner rib being protected by said outer rib such that the coupling device can be safeguarded against a sudden attenuation of its strength.

2. The coupling device as set forth in claim 1, wherein a gate for injection molding is positioned at a portion of the ribbed region extending along either of said first and second peripheral sides of the rod body.

3. The coupling device as set forth in claim 2, wherein a projection is formed laterally of the rod body for positioning the gate.

4. A coupling device, comprising:

an elongated plate-shaped synthetic resin-made rod body, a synthetic resin-made cylindrical portion formed integrally at at least one end of the rod body, and a joint piece provided inside the cylindrical portion and which is to be coupled to a mating object;

the rod body including a plate member presenting a ribbed region extending longitudinally along first and second peripheral sides of said plate member, said ribbed region including rib structure projecting in opposite directions orthogonal to the plate member;

at least a length portion of said rib structure disposed along at least one of said first and second peripheral sides on at least one of opposite faces of said plate member being recessed in an opposite direction to a projecting direction thereof to define a pair of outer and inner ribs spaced-apart from one another over said length portion and positioned within said ribbed region; and the cylindrical portion including axial end faces of a concentric circular shape, at least one of said axial end faces being recessed concentrically along at least a portion of the concentric circular shape to thereby define at least two projecting regions spaced apart from one another within said portion.

5. The coupling device as set forth in claim 4, wherein at least an arcuate portion of said at least two projecting regions is peripherally located on a side of the axial end face corresponding to said at least one of said first and second peripheral sides which includes said pair of outer and inner ribs.

6. The coupling device as set forth in claim 1, wherein only the rib structure along one of the first and second peripheral sides of the plate member is recessed.

7. The coupling device as set forth in claim 6, wherein both the inner and outer ribs of the rib structure which is recessed are smaller in thickness than the rib structure on a remaining one of said first and second peripheral sides not recessed.

8. The coupling device as set forth in claim 1, wherein all of said rib structure longitudinally formed within said ribbed region is recessed to present inner and outer ribs.

9. A coupling devices, comprising:

an elongated plate-shaped synthetic resin-made rod body, a synthetic resin-made cylindrical portion formed integrally at at least one end of the rod body presenting axial end faces, a joint piece provided inside the cylindrical portion and which is to be coupled to a mating object, and an elastic member provided between the cylindrical portion and joint piece; and each of said axial faces of the cylindrical portion being recessed concentrically along at least a portion of a concentric circular shape thereof to define at least two projecting regions spaced apart from one another over at least an arcuate portion of said concentric circular shape.

10. The coupling device as set forth in claim 9, wherein:

the rod body includes a ribbed region formed longitudinally along at least one peripheral side thereof including rib structure projecting in opposite directions, said rib structure defining first and second ribs on at least a portion of said ribbed region projecting in one of said opposed directions; and at least part of the arcuate portion which includes the at least two projecting regions is formed longitudinally codirectional with said first and second ribs of the rod body.

11. The coupling device as set forth in claim 1, wherein said rib structure further includes at least one rib in addition to, and spaced apart from, said first and second ribs.

12. The coupling device as set forth in claim 1, wherein said first and second ribs extend to different heights from said plate member.

13. A coupling device, comprising:

an elongated rod body and a cylindrical portion formed integrally at at least one end of the rod body;

the rod body having a flattened shape presenting first and second faces and first and second laterally peripheral side regions on each of said first and second faces, the rod body including rib structure extending longitudinally along said rod body in said first and second peripheral side regions thereof on both of said first and second faces, portions of said rib structure corresponding to each of said first and second faces projecting in respective directions crosswise to the first and second faces, said rib structure extending along at least one of said first and second sides on at least one of said first and second faces including at least first and second ribs spaced apart from one another and extending over at least a length portion thereof, said first rib being located proximal an outermost edge of said plate member; and said rib structure being laterally spaced apart from a longitudinal central axis of said rod body, said second rib being located between said longitudinal central axis and said first rib, and positioned substantially closer to said first rib than to said longitudinal central axis, said second rib being protected by said first rib such that the coupling device can be safeguarded against a sudden attenuation of its strength.

* * * * *